United States Patent [19]
Janis et al.

[11] Patent Number: 5,128,885
[45] Date of Patent: Jul. 7, 1992

[54] METHOD FOR AUTOMATIC GENERATION OF DOCUMENT HISTORY LOG EXCEPTION REPORTS IN A DATA PROCESSING SYSTEM

[75] Inventors: Frederick L. Janis, Keller; Marvin L. Williams, Lewisville; Diana S. Wang, Trophy Club, all of Tex.

[73] Assignee: International Business Machines Corporation, Armonk, N.Y.

[21] Appl. No.: 484,704

[22] Filed: Feb. 23, 1990

[51] Int. Cl.⁵ .............................................. G06F 11/00
[52] U.S. Cl. ............................. 395/575; 364/DIG. 2; 364/945.3; 371/16.5
[58] Field of Search ............... 371/29.1, 16.5; 364/200, 246.1, 246.12, 281.1, 900, 962.1, 966.7, 945.3

[56] References Cited
U.S. PATENT DOCUMENTS 3,704,363 11/1972 Salmassy et al. .................. 371/29.1
4,833,595 5/1989 Iijima ................................ 364/200

Primary Examiner—Charles E. Atkinson
Attorney, Agent, or Firm—Andrew J. Dillon

[57] ABSTRACT

A method for automatically generating document history log exception reports in a data processing system having multiple resource objects which are managed by one or more resource managers, each resource object being accessible by as plurality of users within a data processing system. A history log is created and associated with a selected resource object. Thereafter, the occurrence of each event and/or action relating to the selected resource object is recorded within the history log. The status of the history log is periodically determined and an exception report is automatically generated and transmitted to a previously designated individual in the event a lack of memory space within the history log will prevent the recordation of a subsequent event or activity. In one embodiment of the present invention an exception report is also generated in the event the selected resource object has been transferred to a resource manager which will not support a document history log.

8 Claims, 3 Drawing Sheets

METHOD FOR AUTOMATIC GENERATION OF DOCUMENT HISTORY LOG EXCEPTION REPORTS IN A DATA PROCESSING SYSTEM

CROSS-REFERENCE TO RELATED APPLICATIONS

The present application is related to the following United States patent applications, each by the inventors hereof, filed of even date herewith and assigned to the assignee herein:

U.S. Patent Application Ser. No. 07/484,706, entitled "Method For Maintaining A Selective Document History Log In A Data Processing System";

U.S. Patent Application Ser. No. 07/484,901, entitled "Method For Memory Management Within A Document History Log In A Data Processing System";

U.S. Patent Application Ser. No. 07/484,606, entitled "Method For Maintaining A Time Frame Selective Document History Log In A Data Processing System"; and U.S. Patent Application Ser. No. 07/484,705, entitled "Method For Maintaining An Alterable Document History Log In A Data Processing System."

The contents of each of the above-referenced applications are hereby incorporated herein by reference thereto.

BACKGROUND OF THE INVENTION

1. Technical Field

The present invention relates in general to data processing systems and in particular to an improved method of maintaining multiple resource objects within a data processing system. Still more particularly, the present invention relates to a method for the automatic generation of document history log exception reports in a data processing system.

2. Description of the Related Art

In large modern data processing systems it is possible to create, store, and access literally thousands of documents or resource objects. Such activities may take place with regard to many users within a data processing system and it is often necessary to keep track of selected resource objects within the system to assure system integrity and maintain a record with regard to selected resource objects or documents within the system.

Document history logs are well known in the prior art Many operating systems, database management subsystems and network subsystems marketed by International Business Machines of Armonk, N.Y. incorporate logging facilities. For example, the Multiple Virtual Storage (MVS) operating system provides a logging system to the console operator so that all commands by the operator as well as the responses of the system are logged Additionally, other events within the system may be written to the operator log. The logging filter in this system is set system wide for all resources within the system by the system programmer. As with all such logging systems this system may be utilized to provide a record for problem reconciliation and to provide an audit trait for security purposes.

Database management systems, such as Customer Information Control System (CICS) and Information Management System (IMS) also utilize a history log. Such history logs are typically utilized to audit events and changes within the database. These logs are then utilized to reconstruct the database in the event of an abnormal termination of the system. As above, such logs record all counts within the system based upon a filter set for the entire system by the database administrator.

Finally, certain network communications subsystems, such as VTAM, or Virtual Telecommunication Access Method utilize a history log system to lcg all network commands and responses. There logs are utilized for problem solving and are generally written to tape or disk storage.

In view of the above, it should be apparent that a need exists for an improved document history log in which the nonrecordability of certain events or activities with regard to particular resource objects will result in the automatic generation of an exception report.

SUMMARY OF THE INVENTION

It is therefore one object of the present invention to provide an improved data processing system.

It is another object of the present invention to provide an improved method of maintaining multiple resource objects within a data processing system.

It is yet another object of the present invention to provide a method for the automatic generation of document history log exception reports in a data processing system.

The foregoing objects are achieved as is now described. The method of the present invention may be utilized to automatically generate document history log exception reports in a data processing system having multiple resource objects which are managed by one or more resource managers and which are accessible by a plurality of users within the data processing system. A history log is created and associated with a selected resource object. Thereafter, the occurrence of each event or action relating to the selected resource object is recorded within the history log. The status of the history log is periodically determined and an exception report is automatically generated and transmitted to a previously designated individual in the event a lack of memory space within the history log will prevent the recordation of a subsequent event or activity. In one embodiment of the present invention an exception report is also automatically generated in the event the selected resource object is transferred to a resource manager which will not support a document history log.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
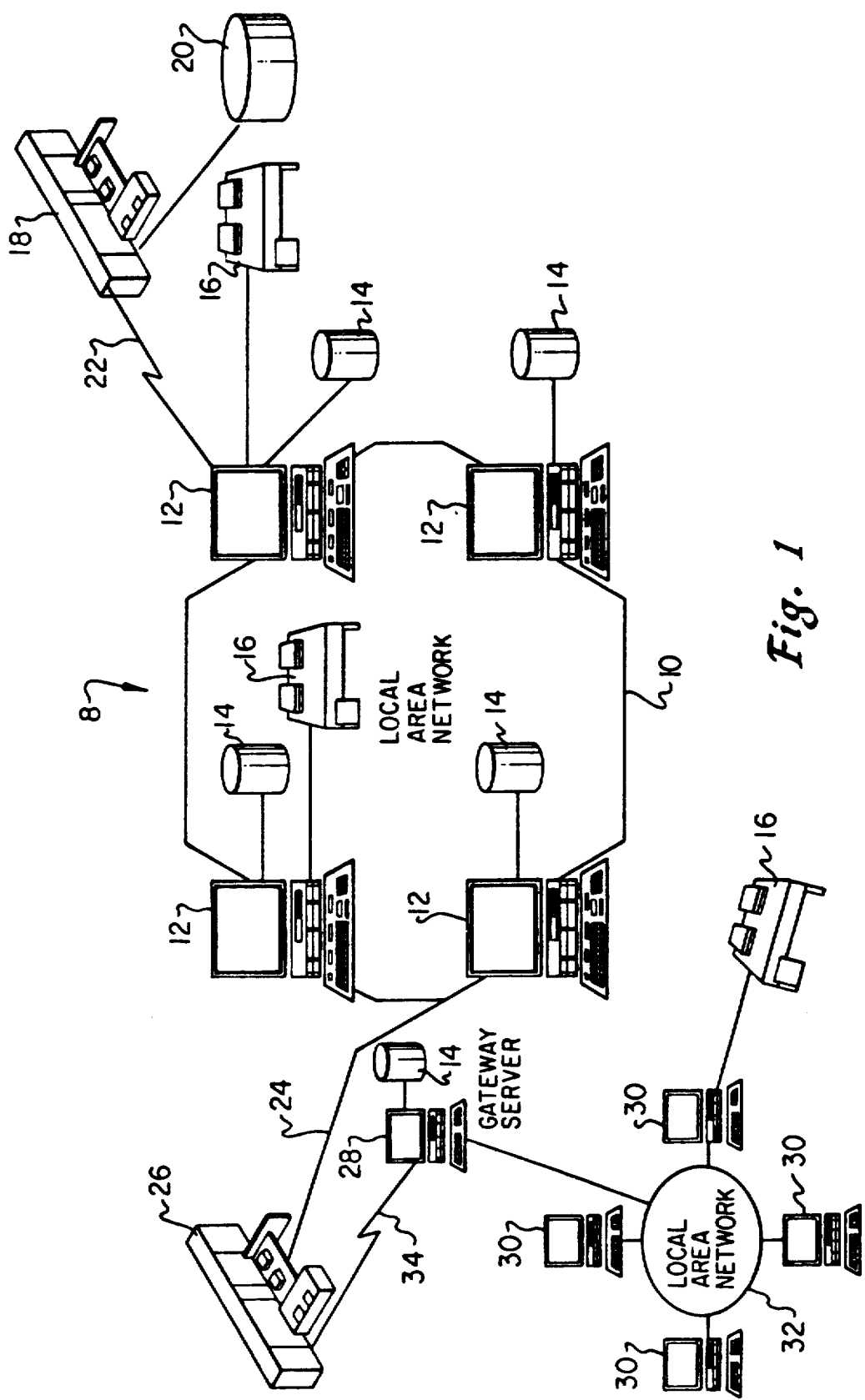
FIG. 1 depicts a pictorial representation of a distributed data processing system which may be utilized to implement the method of the present invention.

With reference now to the figures, and in particular with reference to FIG. 1, there is depicted a pictorial representation of a data processing system 8 which may be utilized to implement the method of the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Interactive Work Stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store documents or resource objects which may be periodically accessed by any user within data processing system 8. In a manner well known in the prior art, each such document or resource object stored within a storage device 14 is associated with a Resource Manager or Library Service, which is responsible for maintaining and updating all resource objects associated therewith.

Still referring to FIG. 1, it may be seen that data processing network 8 may also include multiple main frame computers, such as main frame computer 18, which may be preferably coupled to Local Area Network (LAN) 10 by means of communications link 22. Main frame computer 18 may also be coupled to a storage device 20 which may serve as remote storage for Local Area Network (LAN) 10. Similarly, Local Area Network (LAN) 10 may be coupled via communications link 24 through a subsystem control unit/communications controller 26 and communications link 34 to a gateway server 28. Gateway server 28 is preferably an individual computer or Interactive Work Station (IWS) which serves to link Local Area Network (LAN) 32 to Local Area Network (LAN) 10.

As discussed above with respect to Local Area Network (LAN) 32 and Local Area Network (LAN) 10, a plurality of documents or resource objects may be stored within storage device 20 and controlled by main frame computer 18, as Resource Manager of Library Service for the resource objects thus stored. Of course, those skilled in the art will appreciate that main frame computer 18 may be located a great geographic distance from Local Area Network (LAN) 10 and similarly Local Area Network (LAN) 10 may be located a substantial distance from Local Area Network (LAN) 32. That is, Local Area Network (LAN) 32 may be located in California while Local Area Network (LAN) 10 may be located within Texas and main frame computer 18 may be located in New York.

In known prior art systems of this type it is common for a user in one area of distributed data processing system 8 to access and/or modify a document or resource object within another portion of distributed data processing system 8. It should therefore be apparent that it would be very helpful to have a system whereby the activities of any or all of the users within distributed data processing system 8 with respect to a particular document or resource object may be recorded. However, with known document history log approaches the vast number of users within a distributed data processing system, such as the system illustrated, would clearly overwhelm which simply records each and every activity with regard to a particular resource object.

Figure 2:
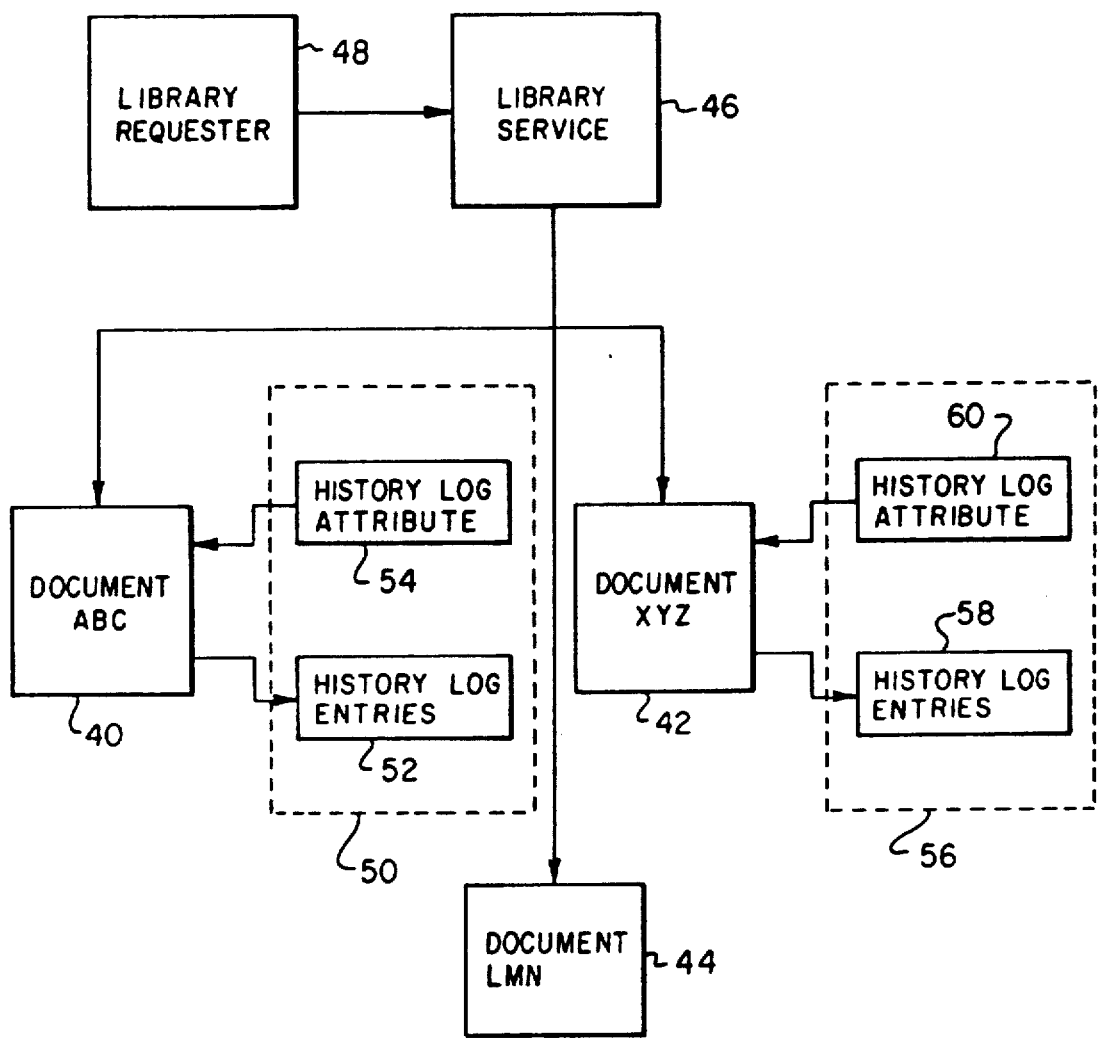
FIG. 2 depicts in block diagram form a document history log system in accordance with the method of the present invention.

Referring now to FIG. 2, there is depicted a block diagram representation of a selective document history log implemented in accordance with the method of the present invention. As can be seen, three documents are represented. Document ABC 40, document XYZ 42 and document LMN 44 are all illustrated as being under the control of library service 46. As discussed above, library service 46 may be implemented utilizing any entity within distributed data processing system 8 (see FIG. 1) which is capable of acting as a resource manager for the documents thus illustrated. Additionally, a library requester 48 is illustrated. Library requester 48 shall correspond to any user within distributed data processing system 8 who desires to access a document or resource object controlled by library service 46.

As is illustrated, each and every document controlled by library service 46 does not require a document history log, in accordance with the method of the present invention As is illustrated, document ABC 40 and document XYZ 42 both have associated therewith a document history log. That is, document history log 50 is associated with document ABC 40 and document history log 56 is associated with document XYZ 42. Document LMN 44 does not require a history log and no such log is illustrated.

In accordance with an important aspect of the present invention, it should be noted that each document history log thus illustrated includes two separate portions thereof. Specifically, document history log 50 includes a section labeled history log entries 52 and a section labeled history log attribute 54. Similarly, document history log 56 includes a section labeled history log entries 58 and history log attribute 60.

As those skilled in the art will appreciate, each history log entry section shall merely comprise a memory location wherein the recordation of activities with regard to an associated document may take place. However, history log attributes 54 and 60 are utilized, in accordance with the method of the present invention, to specify a particular individual to whom an exception report shall be transmitted in the event the memory remaining within a particular history log entry section is insufficient to permit the recordation of a subsequent activity or event.

Additionally, as will be explained in greater detail herein, it is possible to relocate a particular document to a different library service or resource manager. Such relocation may result in a document having a document history log associated therewith being relocated to a library service which will not support a document history log. As will be discussed in greater detail with respect to FIG. 3, in the event a particular document is transferred to a resource manager which does not support a document history log, an exception report will be automatically generated and logged within the existing history log, in accordance with the method of the present invention, and thereafter transmitted to a particular individual previously designated by the creator of the document history log.

In this manner, it will be possible to ensure that the activities and/or events which relate to a particular resource object for which a document history is required will not be lost due to the inability of a subsequent resource manager to support a document history log service or as a result of insufficient memory within a document history log. By automatically generating an exception report to a predesignated individual in either event the method of the present invention ensures that the user who created the document history log will either be notified or will be assured that a specified person will be notified so that the situation may be remedied to prevent the loss of desired document history information.

Figure 3:
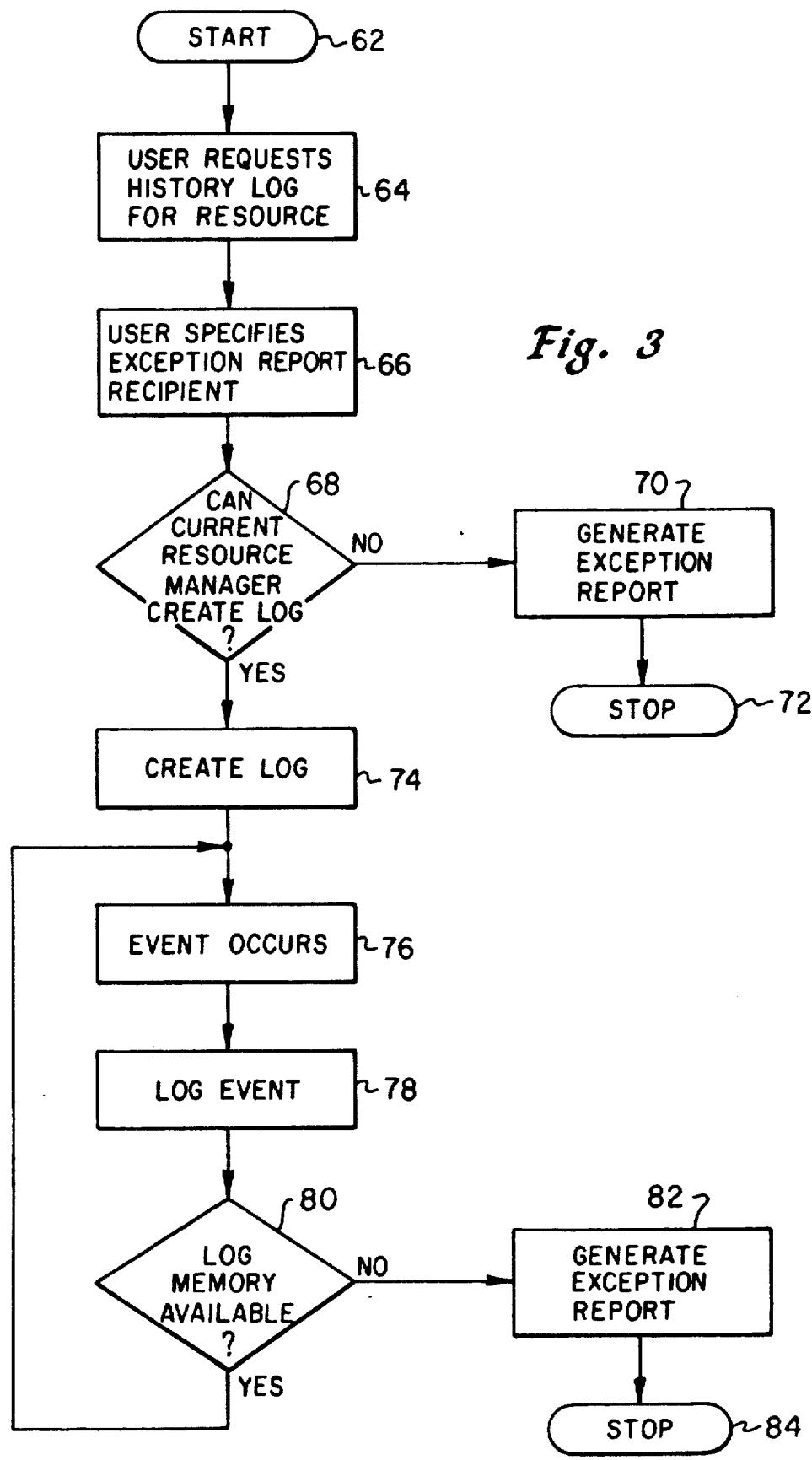
FIG. 3 is a high level flow chart depicting the method for automatically generating a document history log exception report in a data processing system in accordance with the method of the present invention.

With reference now to FIG. 3, there is depicted a high level flow chart which illustrates the method of automatically generating a document history log exception report in accordance with the method of the present invention. As is illustrated, the process begins at block 62 and thereafter passes to block 64 which illustrates the request by a user for a document history log for a selected resource object. Next, block 66 depicts the specification by the user of a recipient for an exception report which may be generated automatically, in accordance with the method of the present invention. Of course, those skilled in the art will appreciate that the user may specify that the exception report shall be transmitted to the user or to the system administrator or other manager who may be called upon to remedy the situation which resulted in the exception report.

Next, block 68 illustrates a determination of whether or not the current resource manager can create or support a document history log. This is particularly important in view of the possibility that a resource object may be relocated to a resource manager other than the resource manager which existed at the initiation of the history log request. In the event the current resource manager cannot support a document history log, then block 70 illustrates the generation of an exception report and the transmission of that report to the recipient previously designated by the user, as previously illustrated in block 66. Thereafter, the process terminates, as illustrated in block 72.

However, in the event the current resource manager does indeed support a document history log, block 74 next illustrates the creation or maintenance of a document history log, as requested by the user. Thereafter, block 76 illustrates the occurrence of an activity or event for which a document history is desired. Block 78 depicts the logging of that event within the document history log created in block 74 and thereafter block 80 illustrates a determination of whether or not sufficient available memory space exists within the document history log to permit the recordation of a subsequent event. If sufficient memory space does not exist within the document history log then block 82 illustrates the generation of an exception report and the transmittal of that exception report to the recipient previously designated by the user in block 66. Of course, documentation of the fact that an exception report has been generated will be logged within the document history log and in the depicted embodiment of the present invention a small amount of memory space is reserved within the document history log for this purpose. Thereafter, the process terminates, as illustrated in block 84. In the event sufficient memory space exists within the document history log to permit the recordation of a subsequent activity or event then the process returns to block 76 and proceeds iteratively thereafter.

As those skilled in the art will appreciate upon reference to the foregoing, the method of the present invention provides a system in which a user can create a document history log with a finite amount of memory space and be assured that all activities and/or events relating to the specified resource object will either be recorded within the history log or will result in the automatic generation of an exception report so that remedial action may take place. In this manner, the recordation of additional activities or events will not result in the loss of previously stored data due to a lack of memory space or the transfer of the resource object to a resource manager which does not support the document history log service.

While the invention has been particularly shown and described with reference to a preferred embodiment, it will be understood by those skilled in the art that various changes in form and detail may be made therein without departing from the spirit and scope of the invention.

We claim:

1. A method in a data processing system of efficiently maintaining a record of activities relating to a selected resource object managed by a resource manager and accessible by a plurality of users within said data processing system, said method comprising the steps of:
   creating a history log having a finite storage capacity;
   associating said history log with a selected resource object;
   recording within said history log those activities relating to said selected resource object;
   automatically generating an indication of the nonrecordability of an activity relating to said selected resource object in the event the recordation of said activity shall exceed said storage capacity; and
   automatically generating an indication of the nonrecordability of an activity relating to said selected resource object in response to a transfer of said selected resource object to a resource manager which does not support said history log.

2. The method in a data processing system of efficiently maintaining a record of activities relating to a selected resource object according to claim 1 further including the step of periodically monitoring the status of said history log to determine the availability of storage capacity therein.

3. The method in a data processing system of efficiently maintaining a record of activities relating to a selected resource object according to claim 1 further including the step of specifying a particular individual to receive said indication of the nonrecordability of an activity relating to said selected resource object.

4. The method in a data processing system of efficiently maintaining a record of activities relating to a selected resource object according to claim 1, further including the step of specifying a particular individual to receive said indication of the nonrecordability of an activity relating to said selected resource object in response to the transfer of said selected resource object to a resource manager which does not support said history log.

5. A data processing system for efficiently maintaining a record of activities relating to a selected resource object managed by a resource manager and accessible by a plurality of users in said data processing system, said data processing system comprising:
   means for creating a history log having a finite storage capacity;
   means for associating said history log with a selected resource object;
   means for recording within said history log those activities relating to said selected resource object;

means for automatically generating an indication of the nonrecordability of an activity relating to said selected resource object in the event the recordation of said activity shall exceed said storage capacity; and means for automatically generating an indication of the nonrecordability of an activity related to said selected resource object in response to a transfer of said selected resource object to a resource manager which does not support said history log.

6. The data processing system for efficiently maintaining a record of activities relating to a selected resource object managed by a resource manager and accessible by a plurality of users within said data processing system according to claim 5, further including means for periodically monitoring the status of said history log to determine the availability of storage capacity therein.

7. The data processing system for efficiently maintaining a record of activities relating to a selected resource object managed by a resource manager and accessible by a plurality of users within said data processing system according to claim 5, further including means for specifying a particular individual to receive said indication of the nonrecordability of an activity related to said selected resource object.

8. A data processing program product for efficiently maintaining a record of activities relating to a selected resource object stored within a data processing system and accessible by a plurality of users within said data processing system, said data processing program product comprising:

instruction means for creating a history log having a finite storage capacity;

instruction means for associating said history log with a selected resource object;

instruction means for recording within said history log those activities related to said selected resource object;

instruction means for automatically generating an indication of the nonrecordability of an activity relating to said selected resource object in the event the recordation of said activity shall exceed said storage capacity; and instruction means for automatically generating an indication of the nonrecordability of an activity relating to said selected resource object in response to a transfer of said selected resource object to a resource manager which does not support said history log.

* * * * *